Jan. 3, 1961  B. C. HOLBEN  2,967,242
TRAVERSING GAUGE MOUNT
Filed April 30, 1956  7 Sheets-Sheet 3

Fig.7

Inventor:
Bernard C. Holben
By Soans, Glaister & Anderson Attys.

Jan. 3, 1961

B. C. HOLBEN 2,967,242

TRAVERSING GAUGE MOUNT

Filed April 30, 1956

Inventor
Bernard C. Holben
By Doane Glaister & Anderson Attys.

Jan. 3, 1961 B. C. HOLBEN 2,967,242
TRAVERSING GAUGE MOUNT
Filed April 30, 1956 7 Sheets-Sheet 6

Inventor:
Bernard C. Holben
By Soans Glaister & Anderson Attys.

United States Patent Office 2,967,242
Patented Jan. 3, 1961

2,967,242

TRAVERSING GAUGE MOUNT

Bernard C. Holben, Worthington, Ohio, assignor to Industrial Nucleonics Corporation, a corporation of Ohio Filed Apr. 30, 1956, Ser. No. 581,453

12 Claims. (Cl. 250—83.3)

The invention relates to an improvement in a means for mounting an inspecting gauge and it is particularly concerned with, but not necessarily restricted to an improvement in a means for mounting a gauge used for inspecting the thickness or other characteristics of sheet material as it issues from production or treatment apparatus, for example sheet metal issuing from a rolling mill.

It is preferred that a gauge for inspecting traveling sheet material issuing from a rolling mill or other apparatus be movable from an inoperative or off-sheet position to operative or on-sheet position and that the equipment for movably supporting the gauging mechanism be highly reliable in respect of its operativeness and that it be very durable and sturdy, especially in connection with heavy industry applications such as steel mill applications.

The main objects of the present invention are to provide a highly reliable and dependable means for movably supporting a gauge for the purposes above referred to; to provide such supporting means which is very sturdy and durable; to provide a gauge mounting which is highly versatile in its adaptability for installation in a variety of crowded and unwieldy gauging locations on existing mills with little or no modification thereto; to provide a gauge mounting whereby the gauge may be moved from working or on-sheet position to an off-sheet position which leaves the working area through which the sheet travels for inspection completely clear and unobstructed so as to permit free access to the machine with which the inspecting apparatus is associated; to provide means for automatically retracting or moving the gauge to off-sheet position in the event that normal movement of the sheet being inspected is interrupted and threatens to cause a pile up of sheeting against a side of the gauge; to provide controls for insuring operation of the mechanism without substantial shock or jar; and to provide adjustable, automatic controlling means for determining the extent of on-sheet movement of the inspecting mechanism and the operative position thereof relative to the width of the sheet which is to be inspected.

In general, it is the object of the invention to provide an improved traversing mount for a gauge of the character indicated, and other objects and advantages of the invention will be understood by reference to the following specification and accompanying drawings (7 sheets) in which there is described and illustrated a traversing gauge mount embodying a selected form of the invention and certain modifications of the same.

The gauge structure illustrated in the drawings may be mounted at any desired point along the path of travel of sheet steel or other material which is to be inspected by the gauge mechanism. For example, in a steel rolling mill, the mechanism may be located between successive sets of rolls or it may be located adjacent the discharge side of the last set of rolls. The location is, of course, selected to provide inspection of the sheet at the desired point in the fabrication of the sheet. The mechanism is supported from any suitable supporting structure which, in this instance, is represented as comprising a plurality of angle iron members 1 (Figs. 1 and 5) from which the gauge is suspended.

Figures 1, 2, 3, 4:
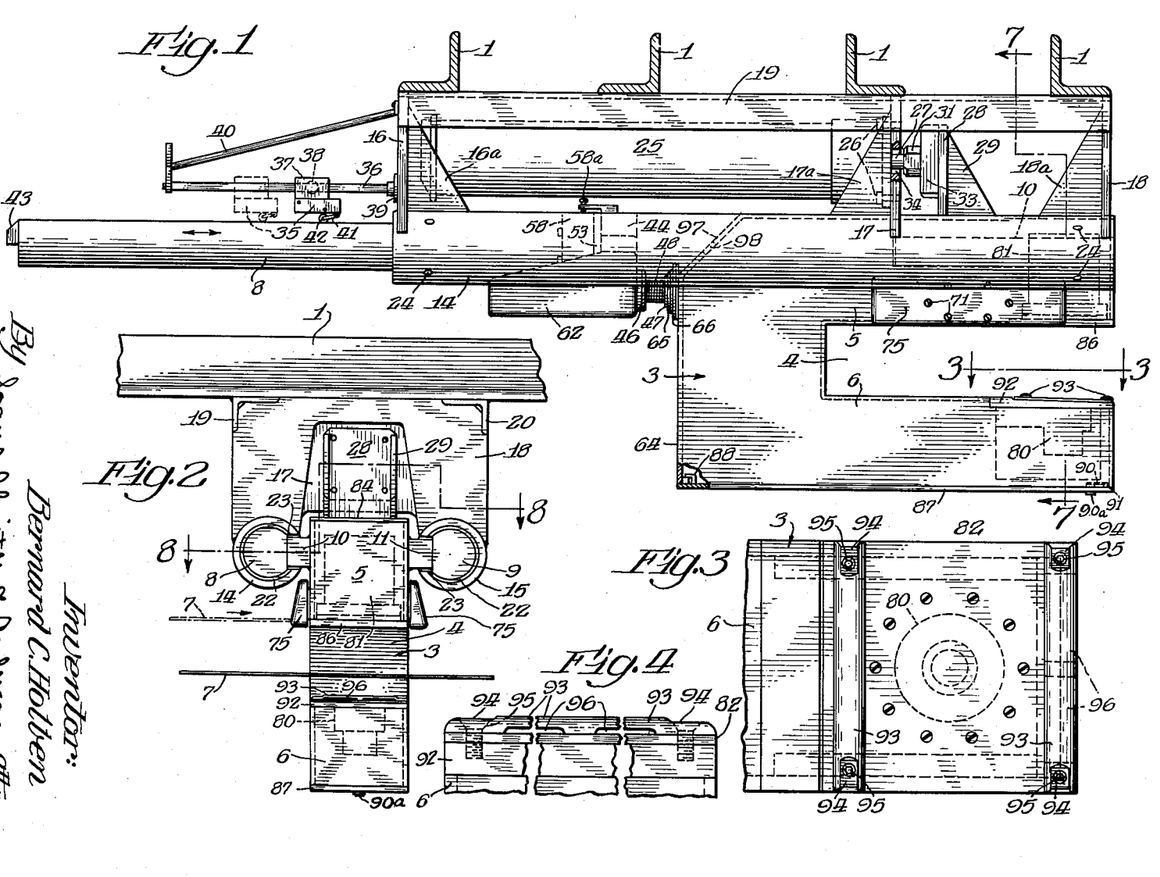
Fig. 1 is a side elevation showing the mechanism in the off-sheet position.
Fig. 2 is an end elevation of the right hand end of the structure as illustrated in Fig. 1.
Fig. 3 is a fragmentary plan view of the area represented by the line 3—3 of Fig. 1.
Fig. 4 is an enlargement of a portion of Fig. 2.
Figures 5, 6:
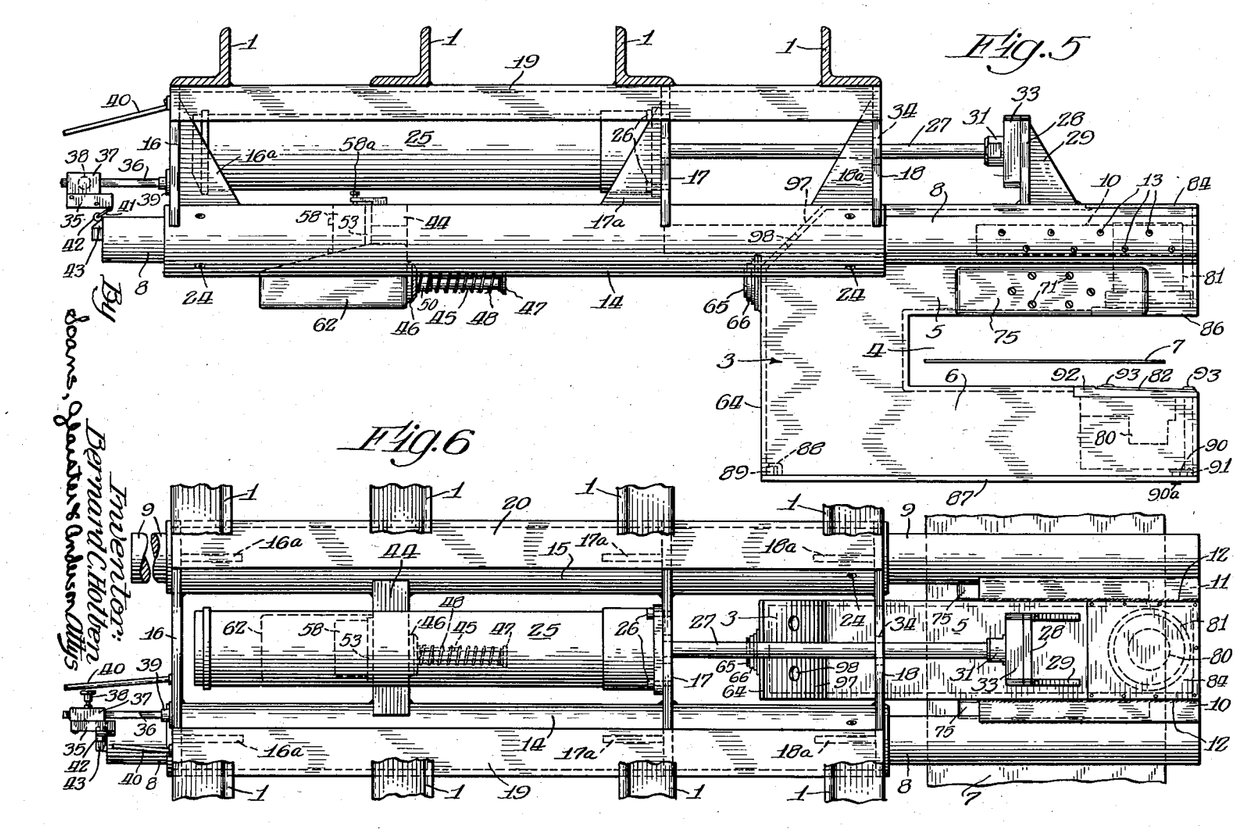
Fig. 5 is a side elevation corresponding to Fig. 1, but showing the mechanism in on-sheet position.
Fig. 6 is a plan view of the apparatus as shown in Fig. 5.

The principal part of the inspecting mechanism is a hollow U-shaped frame or head 3, the U-shape being placed on its side so that the slot 4 between the vertically spaced side arms 5 and 6 of the head is operative to permit passage of a horizontally moving sheet 7 (Fig. 5) between said arms. Said sheet 7 may be a metal or other sheet which is to be inspected as shown in Fig. 5 where the gauge is shown in one-sheet position. Figure 1 shows the gauge in off-sheet position.

Figure 7:
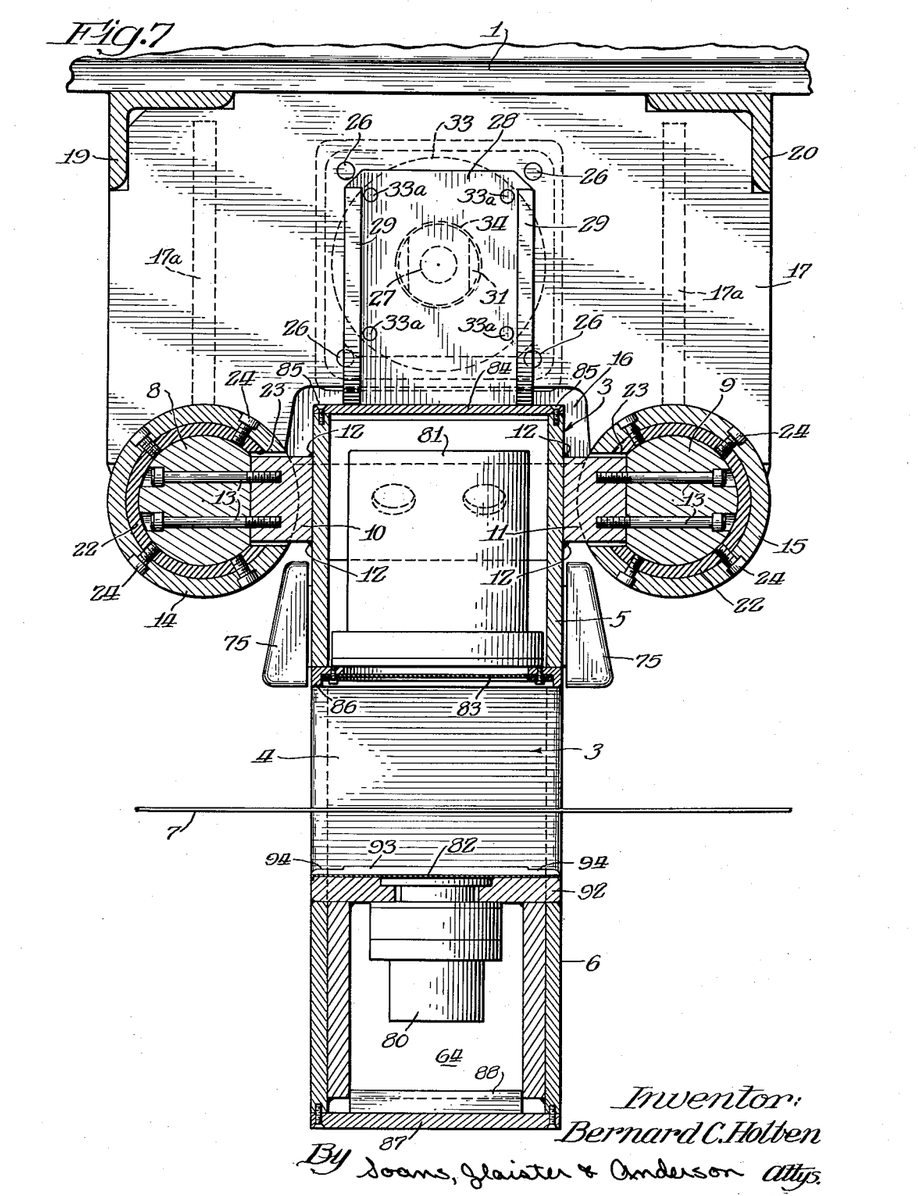
Fig. 7 is a section on the line 7—7 of Fig. 1.

The gauge head 3 is made of metal plates welded together although any other suitable construction may be used. The head is suspended from a pair of traversing rods 8 and 9 (see Figures 2, 6 and 7) through the agency of elongated mounting blocks 10 and 11 respectively. The mounting blocks 10 and 11 respectively are welded to the opposite sides of the head 3 as indicated at 12 in Figure 7. Said blocks 10 and 11 are respectively secured to the traversing rods 8 and 9 by means of a plurality of bolts 13 which pass through the rods and are threaded into the respective mounting blocks 10 and 11. The traversing rods 8 and 9 are of circular cross section but are provided with flat areas on which the mounting blocks 10 and 11 are seated as shown in Figure 7. The traversing rods 8 and 9 are longitudinally slidable in tubes 14 and 15 respectively which are suspended from the supporting frame elements 1 as best shown in Figures 1, 2 and 7.

The tubes 14 and 15 are rigidly interconnected at suitable intervals by means of cross plates 16, 17 and 18, these cross plates each having depending leg portions which have their ends cut to fit the upper portion of the circumference of the respective tubes 14 and 15, said leg ends being welded to the respective tubes. The cross plates 16, 17 and 18 are also provided with laterally extending bracket-like flange portions 16a, 17a and 18a respectively which have their lower ends in engagement with the top surfaces of the tubes and welded thereto so as to aid in rigidly maintaining the plates 16, 17 and 18 relative to the respective tubes. The upper corner portions of said cross members 16, 17 and 18 are interconnected by means of longitudinally extending angle iron members 19 and 20, the corner portions of said cross plates being welded to said angle iron members so as to provide a very rigid structure. The longitudinally extending angle members 19 and 20 are bolted or otherwise suitably fastened to the supporting elements 1.

Figure 8:
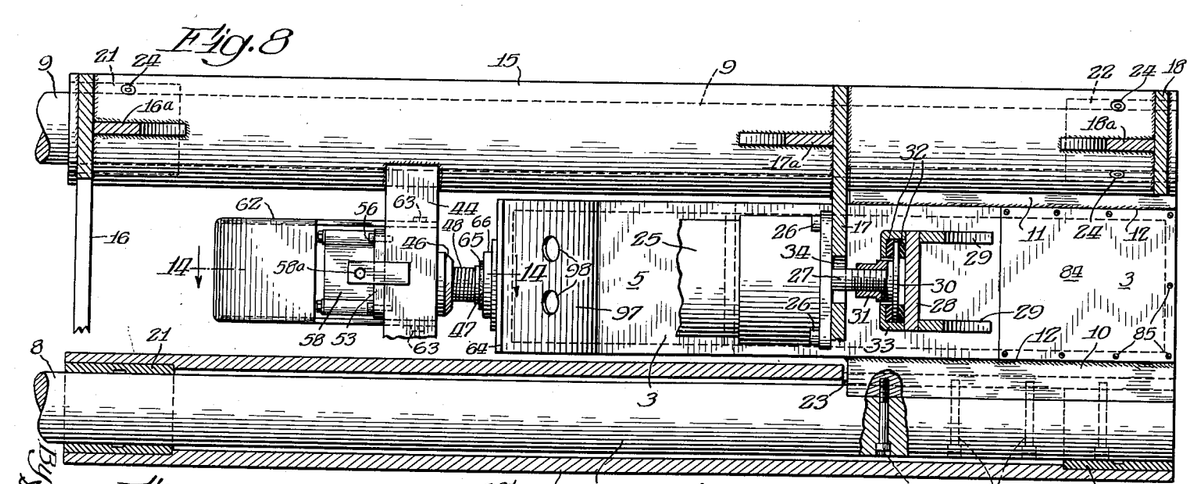
Fig. 8 is a plane section on the line 8—8 of Fig. 2.

The traversing rods 8 and 9 are guided for sliding movement in the respective tubes 14 and 15 by suitable bearing bushings 21 and 22 (Figure 8). The rear or outer end bushings 21 extend completely around the respective rods but the front or inner end bushings 22 have their inner portions slotted as indicated at 23 (Figure 7) to receive the mounting blocks 10 and 11. These bushings 21 and 22 are secured in fixed position in the respective tubes by suitable means such as screws 24. Between the bushings 21 and 22, the rods 8 and 9 are free of contact with the respective tubes or housings so as to avoid excessive frictional resistance to movement of the rods longitudinally in said tubes or housings.

The inspecting head 3 and its supporting rods 8 and 9 are adapted to be advanced and retracted, that is, moved to on-sheet and off-sheet positions, by means of a pneumatic or hydraulic cylinder 25 (see Figures 1 and 5). This cylinder is flange mounted at one end on the cross plate 17 by means of bolts 26. The piston rod 27 which is connected to a piston (not shown) within the cylinder 25, has its outer end connected to the top wall of the upper leg 5 of the U-shaped inspecting head. For connecting the piston rod to the top wall of said inspecting head, said head is provided with an upstanding bracket embodying an outwardly or rearwardly facing plate 28 and inwardly extending side flanges 29 (see Figures 1, 7 and 8) these parts being welded together to form a rigid bracket and being welded to said top wall of the inspecting head so as to be rigid therewith.

The piston rod 27 has secured thereto a circular flange 30 (Fig. 8), this flange being provided with a hub 31 which is screwed on the end of the piston rod 27. The flange 30 is located between a pair of compressible rubber or other cushion discs 32 and said flange and cushion discs are housed within a chamber formed by the bracket plate 28 and recessed fitting 33 which is suitably rigidly secured to said plate 28, as by screws 33a (Figure 7). This rubber cushion connection of the piston rod 27 to the inspecting head avoids the need for extreme accuracy in respect of the alignment of the pneumatic cylinder and the direction of movement of the inspecting head and also serves to some extent to cushion the stopping of movement at the ends of the projecting and retracting movements of the structure. The cross plate 17 is provided with an opening as indicated at 34 for permitting passage of the piston rod 27.

Movement of the inspecting head 3 to one-sheet and off-sheet positions is normally controlled by a suitable valve of known character which is suitably connected to the opposite ends of the cylinder 25, said valve structure and connections being not herein illustrated. The valve may be manually or automatically controlled as desired. In some installations, the said valve may be actuated or other means provided to cause the inspecting head to continuously reciprocate back and forth across the width of the sheet or any selected portion thereof while the sheet continues its movement, to thereby provide inspection along a sinuous path across the desired width of the sheet rather than along a straight path paralleling an edge of the sheet.

Provision is made for easily adjusting the on-sheet position of the inspecting head in order that any selected portion of the width of the sheet may be inspected, it being understood that the inspection area is a relatively small portion of the width of the sheet. One such adjustable control is illustrated in Figures 1, 5 and 6. It comprises an electric switch 35 which is slidably mounted on a stationary rod 36 by means of a suitably bored mounting block 37. A screw 38 threaded through the mounting block 37 is engageable with the rod 36 to secure the switch in any selected position along the length of said rod. Said rod 36 is fixedly mounted at one end as indicated at 39 on the cross plate 16 and the other end of said rod is rigidly supported by means of braces 40 which are connected to said rod 36 and to the plate 16.

The switch 35 is actuated by means of a pivoted arm 41 which carries a roller 42, said arm and roller being positioned so that the roller 42 will ride on the upper surface of the traversing rod 8. The switch 35 is normally closed to maintain an electric circuit which controls the valve mechanism for actuating the piston in the cylinder 25. When the inspecting head reaches the desired on-sheet position, the free end of the rod 8 is moved from under the roller 42 to permit the roller and arm 41 to rock downwardly, thereby actuating the switch 35 to said electric circuit to thereby suitably affect the cylinder control valve to stop further movement of the piston in the cylinder 25. The free end of the rod is provided with a bevelled striker plate 43 which, upon retraction of the inspecting head, engages the roller 42 and swings the switch arm 41 upwardly to again close the switch 35 in preparation for the next on-sheet movement of the inspecting head. It will be seen that by adjusting the switch structure 35 along the supporting rod 36, the on-sheet movement of the inspecting head may be terminated at any selected position in the length of the possible on-sheet travel of the head.

Figure 14:
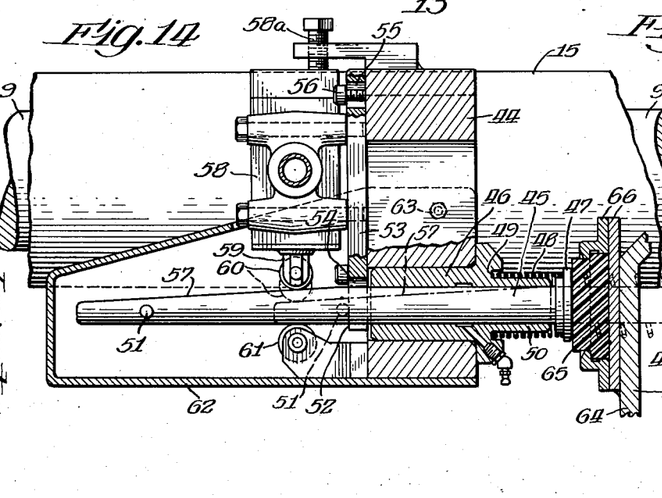
Fig. 14 is a section on the line 14—14 of Fig. 8.

When the cylinder 25 is connected to a source of pressure fed oil or other relatively incompressible liquid for actuating the piston, it is preferred that means be provided for decelerating the off-sheet movement of the head during the terminal portion thereof. One suitable form of decelerating mechanism is illustrated in Figures 5, 8 and 14. As shown in these figures, a bracket member 44 has an upper portion which is rigidly secured to the tubes 14 and by welding or otherwise, said bracket also has a depending central portion in which a rod 45 is slidably mounted through the agency of a bushing 46. The rod 45 extends in the direction of movement of the inspecting head and its supporting rods 8 and 9.

The rod 45 is provided with an end enlargement or flanged head 47 and a spring 48 is positioned between said flanged head 47 and a seat 49 provided in the bushing 46. The bushing is provided with an extension portion 50 which keeps the spring 48 out of contact with the bearing surface of the rod 45. The spring 48 is normally under compression and tends to move the rod in the direction of on-sheet movement of the inspecting head. Said rod 45 is in an extended position when the inspecting head is on-sheet, as represented in Figure 5. A cross pin 51 carried by the rear end portion of said rod 45 serves to limit movement of the rod by the expansive pressure of the spring 48, said cross pin engaging the face 52 of a plate 53 which is vertically adjustably secured to the bracket 44. This plate 53 is notched as indicated at 54 for receiving the rod 45. Vertically adjustable mounting of the plate on the bracket 44 is effected by providing the plate with vertically extending slots such as indicated at 55 through which clamping screws 56 extended into threaded engagement with suitably tapped holes in the bracket 44.

Said slide rod 45 has an upper surface portion 57 flattened and disposed at an outward or rearward and downward angle as best shown in Figure 14.

A valve 58 is bolted to the plate 53 and has an actuating plunger 59 provided with a roller 60 which rides on the inclined surface portion 57 of said rod 45. Spring or other pressure applied to the valve rod 59 urges the roller 60 into engagement with said inclined surface 57 which is flattened transversely of the length of the rod, and such pressure and engagement is sufficient to prevent rotation of the rod. To prevent downward deflection of the rod incident to the pressure of said roller 60, a rod supporting roller 61 is provided, the same being suitably mounted on a portion of said bracket 44. A housing 62 secured at 63 to the sides of the depending portion of the bracket 44 encloses some of the parts. For cooperating with the plunger rod 45, the outer end wall 64 of the inspecting head 3 is provided with a rubber or other compressible material bumper 65, this bumper being carried by a housing structure 66 which is suitably welded to said end wall 64 as indicated in Figures 5 and 14.

When the inspecting head 3 is retracted to the off-sheet position in which it is shown in Figure 1, the bumper 65 engages the enlarged end 47 of the rod 45 and effects rearward or outward movement thereof. Incident to such movement, the inclined cam surface 57 on said rod effects upward movement of the valve plunger 59 whereby the flow of oil or other fluid to the hydraulic cylinder is gradually reduced during a terminal portion of the off-sheet movement of the inspecting head. This gradual reduction of the fluid flow serves to gradually decelerate the off-sheet movement of the inspecting head to thereby avoid shocks on the equipment. It will, of course, be understood that the valve 58 is connected in the pipe line which delivers pressure fluid to the cylinder 25 for effecting off-sheet movement of the inspection head.

The decelerating effect caused by rearward movement of the slide rod 45 may be adjusted by vertically adjusting the position of the valve 58. This may be done by loosening the screws 56 and moving the valve up or down as desired, and then securing the valve in adjusted position by tightening said screws 56. A backing or stop screw 58a is vertically adjustable in a bracket arm which is rigid with said bracket 44. Said screw 58a serves to resist upward movement of the valve 58 under the valve plunger actuating force of the cam 57.

By reference to Figure 5, it will be apparent that in the event that the sheet 7 being inspected becomes broken or in some other way deflected from its proper course, the sheet, continuing to be fed, would tend to pile up against the side of the inspecting head. Considerable force on the inspecting head may result therefrom and damage might be caused to the inspecting head and perhaps other injurious effects might occur. To prevent the occurrence of such damage, provision is made for automatically effecting retraction or off-sheet movement of the inspecting head in the event of such a pile up of the material being inspected.

The last mentioned safety means comprises an electrical switch 67 (Figs. 12 and 13) which is located in the upper arm 5 of the inspecting head. The side wall of this arm is provided with an opening 68 in the lower portion thereof to permit the mounting of a switch 67 in said arm. This switch is carried by a bracket 69 which is secured to a cover plate 70 and this cover plate 70 is secured by screws 71 in place over the opening 68. The switch 67 is preferably of the type known as a microswitch, that is, a switch which is actuated by a very small increment of movement imparted to a part thereof such as a plunger 72.

Figure 12:
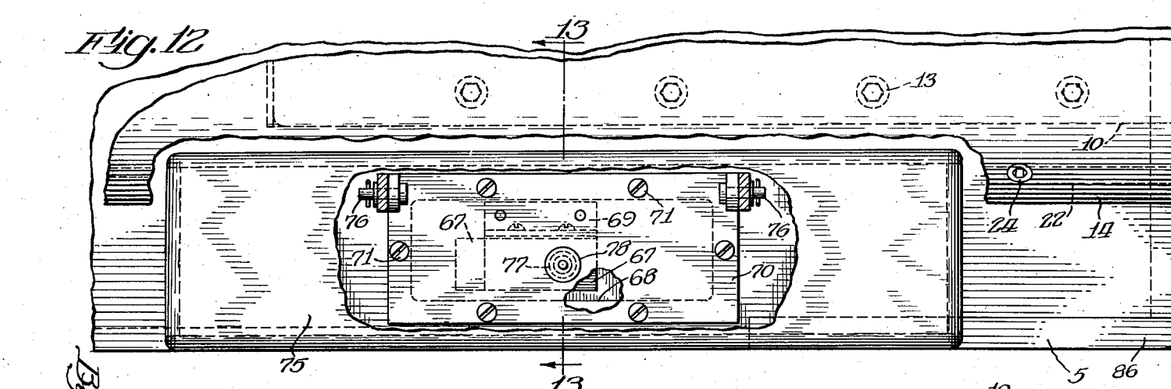
Fig. 12 is a fragmentary elevation corresponding to a portion of Fig. 1, but on an enlarged scale and with certain elements broken away to reveal certain details of construction.
Figure 13:
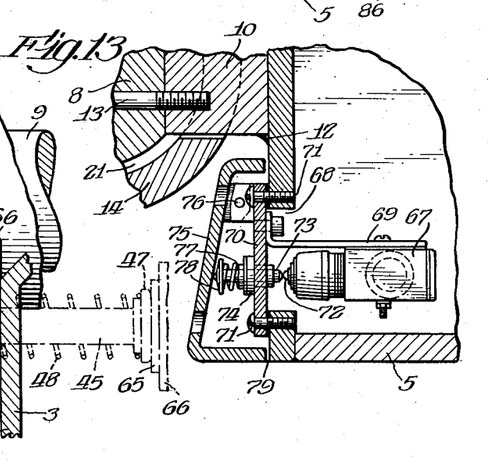
Fig. 13 is a section on the line 13—13 of Fig. 12.

A plunger 73 suitably slidably mounted in a bushing 74 in the cover plate 70 has one end in abutting engagement with the switch plunger 72 and its opposite end in engagement with a flanged cover or plate 75. This flanged cover 75 is pivotally mounted as indicated at 76. A spring 77 between a flange 78 on the plunger 73 and a portion of the bushing 74 normally supports said plate 75 in predetermined position with its flanges free of contact with the adjacent wall of the inspection head arm 5 as indicated at 79.

In the event that the sheet 7 which is being inspected leaves its normal path of movement through the slot 4, it will usually move upwardly into engagement with said pivoted plate 75 and press the same sufficiently to move the plunger 73 so as to actuate the microswitch 67. This microswitch 67 is connected in an electrical circuit which, when changed by actuation of said switch 67, may automatically initiate off-sheet movement of the inspecting head to get it out of the way of the deflected sheet 7, and actuation of said switch may also cause the giving of signals to direct an attendant's attention to the improper operation almost immediately that the same starts. Other mechanisms may also be started or stopped incident to the actuation of said switch 67. Such an automatic control is preferably provided on both sides of the inspecting head as indicated in Figure 7, but it may be provided on only the receiving side of the head if desired.

The lower arm portion 6 of the inspecting head is provided with a suitable source of radiation which is represented at 80 in Figures 1 and 7 and the upper arm 5 is provided with a suitable radiation detector 81, these units 80 and 81 being suitably mounted in the respective arms. Both of these arms are provided with suitable thin windows 82 and 83 for permitting the passage of radiation from the source 80 to the detector 81 and said detector 81 is suitably connected to electronic circuits and devices whereby predetermined variation from a pre-selected normal amount of radiation received by the detector 81, will be caused to effect such operations as may be desired; for example, signal an attendant, automatically effect whatever adjustments may be called for, correct an inaccuracy indicated by the variation, automatically record the thickness (or other condition) of the sheet continuously or at predetermined intervals along its length, and others.

The upper arm 5 of the U-shaped head is provided with an access panel 84 on its upper side, this access panel being suitably fastened in place as by screws as shown at 85 in Figure 7. Also, on the lower side of said upper leg, the window 83 is mounted in a frame 86 which may also be detachably secured in place by screws or otherwise to provide access to the interior of the arm. The lower arm 6 has its bottom wall formed by a removal plate or panel 87. This panel may be detachably secured in place by screws or in any other suitable manner. For example, quick mounting and de-mounting of the plate 87 may be obtained by providing the plate 87 at one end with a hook shaped ledge 88 (Fig. 5) which is adapted to engage a suitable retaining bar provided on the inside of the rear wall 64. At the opposite end, the plate 87 may be provided with one or more clips 90 rotatably supported in the panel and adapted to engage supporting ledges 91 provided on the inside of the adjacent end wall of said arm 6. The clips 90 may be connected to a pivoted pin or stem 91a which extends through the plate 87 to the outside thereof so as to be rotatable by means of a screw driver or other suitable tool.

The window 82 on the top of the lower arm 6 of the inspecting head is subject to injury in the event that the sheet 7 being inspected happens to sag and drags or rubs across the lower arm. To prevent such injury, a pair of skid bars 93 (Figs. 1, 3 and 4) are mounted on said upper arm in overlying relation to spaced portions of the window panel 82. These skid bars have recessed end portions as shown at 94 through which suitable screws 95 pass into the plate 92 for securing the skid bars in place. These skid bars are preferably recessed on their under surfaces as indicated at 96 (Figure 4) so as to permit oil or other liquid which may happen to drop on the window to escape from the surface thereof so as to thereby avoid the formation of a film or screen which might effect the amount of radiation which may pass from the source to the detector. As shown in Figure 1, the top surface of the screen 82 is disposed at a slight angle to insure drainage of liquid from the top surface of the screen.

The various cover plates and access panels on the inspection head are seated on suitable gaskets to produce moisture proof joints so that the interior of the inspection head may be kept free from moisture. The upper outer or rear corner of the inspection head is formed with an angularly disposed wall portion 97 which is provided with openings 98 (Fig 8) for receiving fittings for connecting electrical conduits to the inspection head.

Figures 9, 10:
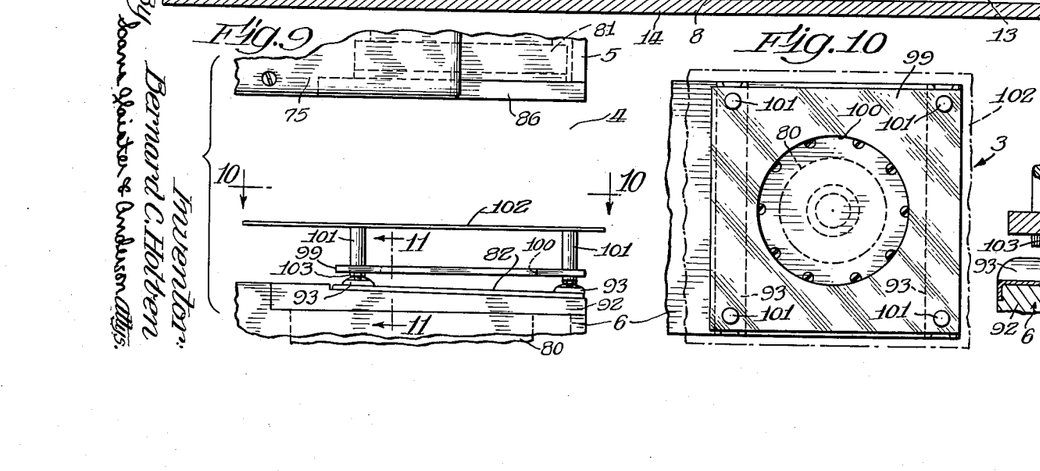
Fig. 9 is a fragmentary elevation on an enlarged scale of a portion of the mechanism as represented in Fig. 1, but showing an accessory in place for certain purposes.
Fig. 10 is a plan in the plane represented by the line 10—10 of Fig. 9.
Figure 11:
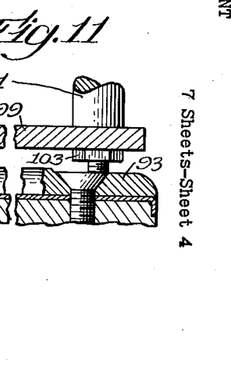
Fig. 11 is a section on the line 11—11 of Fig. 9.

In Figures 9, 10 and 11 there is illustrated an accessory for holding samples of sheeting to be inspected in the plane of the proper path of travel of the sheet. The thickness or other qualities of samples of sheeting may be measured while supported on this accessory and the accessory is also useful for supporting samples of the sheeting while calibration or setting of recording and control instruments is made. This accessory comprises a plate 99 which is centrally apertured as indicated at 100. Four or any other suitable number of posts 101 are mounted on the plates so as to project upwardly therefrom to the desired height for supporting a sample 102 of sheeting in the proper plane for inspection purposes. These posts have reduced end portions which project through suitable holes in the plate and are threaded to receive nuts 103 to fasten the posts in place. The lower ends of the reduced end portions of the posts are adapted to seat on the end portions of the protective skid bars 93 as best shown in Figures 9 and 11. The downward projections of one pair of posts 101 are extended somewhat further than those of the other pair in order to compensate for the incline of the surface of the window 82 as shown in Figure 9 so that the sample 102 will be supported in the desired level position.

The described structure is such that it may be readily made heavy and rugged enough to withstand the normal and abnormal forces to which the device may be subjected when it is associated with a steel production line. For circumstances where lesser forces may be encountered, the structural details may be modified to make the structure somewhat lighter.

The fixed mounting of the supporting frame structure for the device is located wholly to one side of the path of travel of the sheet which is to be inspected and when the inspecting head is retracted to off-sheet position, the area through which the sheet normally travels is completely cleared and free access is made available to the rolling mill or other machine parts without interference from the inspecting mechanism.

The pneumatic or hydraulic cylinder drive for projecting and retracting the inspecting head is made sufficiently strong to withstand high enough fluid pressures to enable the driving mechanism to quickly move the heavy inspection head off sheet in an instant if an emergency happens to arise.

Figure 15:
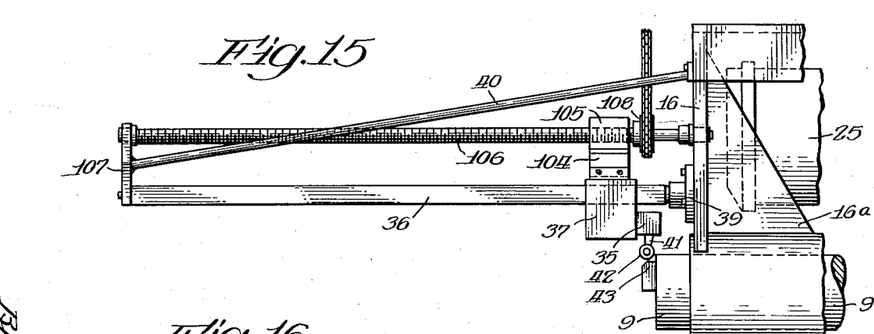
Fig. 15 is a side elevation which corresponds to a portion of Fig. 1, but showing a modification of certain details.

Instead of the directly manually adjustably mounted limit switch 35 as shown in Figure 1, provision may be made for adjusting said switch from a remote position. For example, as shown in Figure 15, the limit switch 35 may be provided with an upwardly extending bracket or arm 104 which carries a nut 105 which engages a screw threaded shaft 106. The shaft 106 is suitably journaled for rotation in the end plate 16 and in a bracket plate 107 carried by the slide rod 36 and the braces 40. A sprocket 108 is secured to a portion of screw shaft 106 and this sprocket may be chain driven so as to rotate the screw 106 from a remotely located manually rotatable counter shaft, or a remotely located electric motor, or by a clutch connection to some other available driven means. Whatever the drive means, it should be reversible so that rotation of the screw shaft may be effected to adjust the position of the limit switch in either direction along said rod 36.

Figures 16, 17:
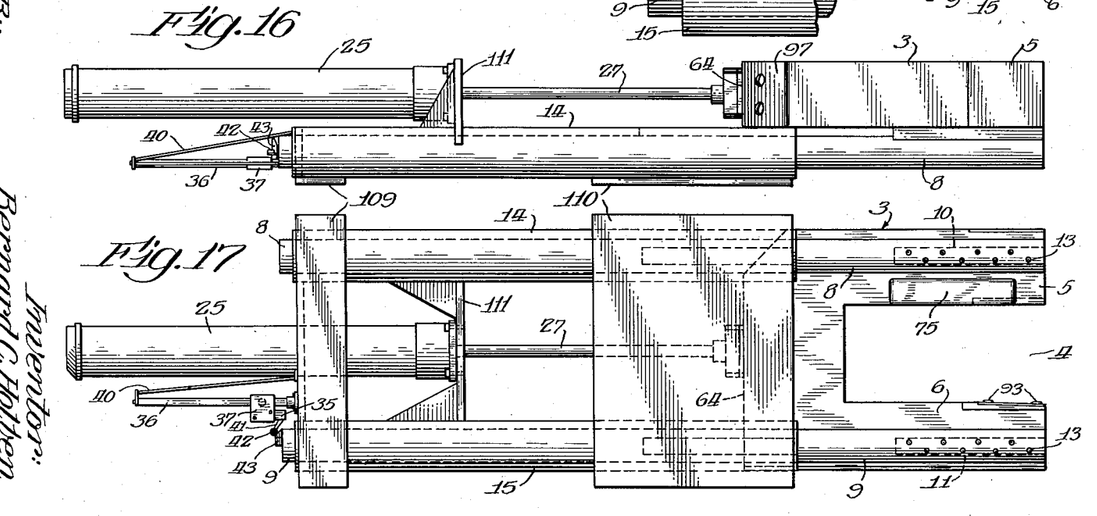
Figs. 16, 17 and 18 are plane, side elevation and end elevation views respectively of a modified arrangement.
Figure 18:
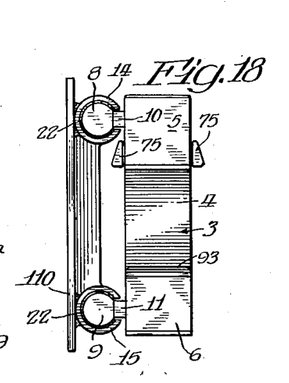

In some instances, it may be preferable to support the mechanism from one side instead of suspending from above. In that event, the traversing rods 8 and 9 and their guide cylinders 14 and 15 are placed in a vertical plane, that is, with the axis of one of said guide rods vertically above the other. The upper arm of the U-shaped inspection head may be secured to the uppermost traversing rod and the lower arm of the U-shaped head secured to the then lowermost traversing rod. Such an arrangement is shown in Figures 16, 17 and 18. As there shown, the housing tubes 14 and 15 are vertically disposed one above the other in axially horizontal position, the tubes being rigidly interconnected by vertically extending plates 109 and 110. The plates 109 and 110 may be bolted or otherwise secured to any available side support. In this instance, the actuating piston rod is secured to the end wall 14, of the head 3 and the cylinder 25 to a cross member 111 which is rigidly secured to the cylinders 14 and 15 and constitutes the counterpart of the cross member 17 of Fig. 1. The inspecting head is movable from on-sheet to off-sheet position in substantially the same way as above described in connection with Figures 1 to 5.

Figures 19, 20:
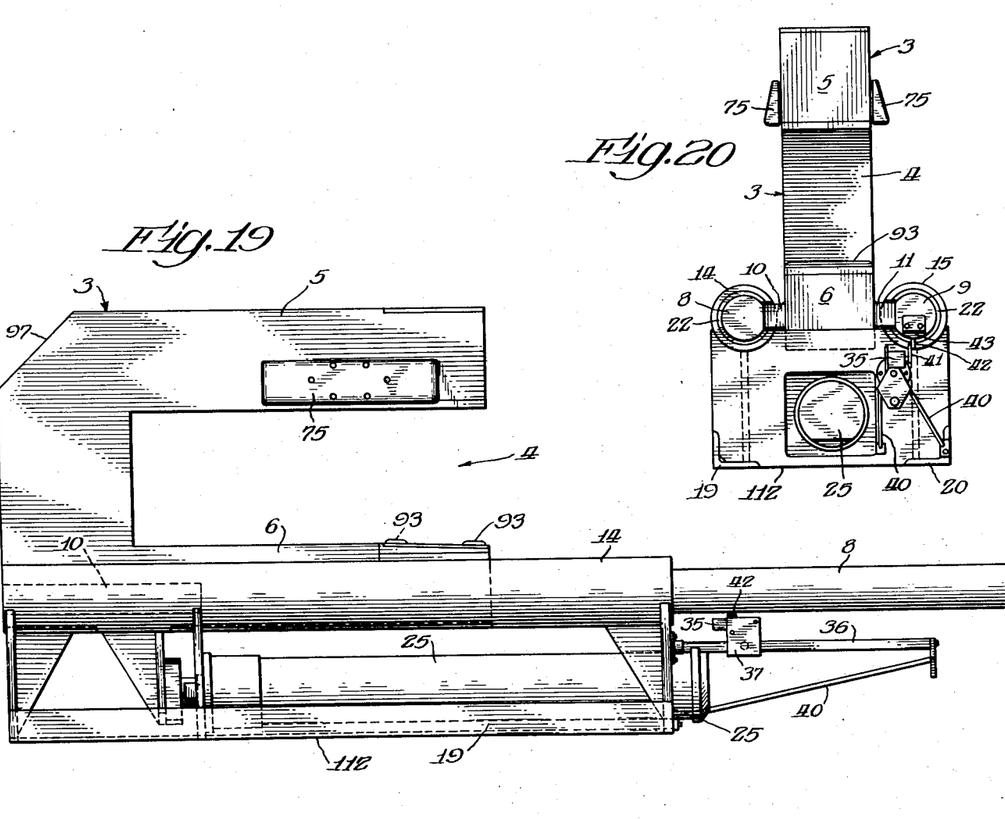
Figs. 19 and 20 are side elevation and end views respectively of another modified arrangement.

Further variation in the mounting is represented in Figures 19 and 20 wherein the U-shaped inspecting head 3 is arranged for base mounting. The operating structure is substantially the same as that already described, but the supporting frame or base 112, extends downwardly from the guide tubes 14 and 15 so that it may be mounted on a pedestal or other support. Also in Figure 18, the U-shaped head is illustrated turned 180° with reference to the operating mechanism from the position shown in Figure 1 so that when the rods 8 and 9 are in retracted position as shown, the inspection head is on-sheet instead of off-sheet. In this arrangement, when the guide rods 8 and 9 are projected, the inspecting head will be moved to off-sheet position. However, the inspecting head may in this base mounted arrangement occupy the same relationship to the operating mechanism as in Figure 1 so that when the guide rods 8 and 9 are retracted, the inspecting head will also be moved to off-sheet position.

Many other variations in the mounting of the device and in the details of its construction may be made within the scope of the invention.

I claim:

1. An inspecting head adapted for mounting a radiation source and a radiation detector, said head including a pair of spaced arms which are adapted to embrace a traveling sheet for inspecting the same, means for mounting said head for reciprocating movement from on-sheet to off-sheet position and from off-sheet to on-sheet position, said means comprising a pair of rigidly interconnected guide tubes, and a pair of traversing rods respectively slidably mounted in said tubes for telescopic movement relative thereto, said inspecting head being rigidly secured to mutually adjacent end portions of said rods, and a fluid operated piston and cylinder driving device interconnecting said guide tubes and said inspecting head for effecting reciprocation of the latter.

2. An inspecting head adapted for mounting a radiation source and a radiation detector, said head including a pair of spaced arms which are adapted to embrace a traveling sheet for inspecting the same, means for mounting said head for reciprocating movement from on-sheet to off-sheet position and from off-sheet to on-sheet position, said means comprising a pair of rigidly interconnected guide tubes, and a pair of traversing rods respectively slidably mounted in said tubes for telescopic movement relative thereto, said inspecting head being rigidly secured to mutually adjacent end portions of said rods, and a fluid operated piston and cylinder driving device interconnecting said guide tubes and said inspecting head for effecting reciprocation of the latter, and adjustable means for determining the extent of on-sheet movement of said inspecting head to thereby facilitate inspection of a traveling sheet at any selected location in the width thereof.

3. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected, axially parallel, guide tubes, a pair of traversing rods respectively slidably mounted in said tubes for telescopic movement relative thereto, said inspecting head being rigidly secured to mutually adjacent end portions of said rods, a fluid operated piston and cylinder driving device interconnecting said guide tubes and said inspecting head for effecting reciprocation of the latter, and adjustably mounted means having operating engagement with one of said traversing rods for stopping movement thereof in one direction in accordance with the position to which said means is set relative to the travel of the cooperating guide rod.

4. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected, axially parallel, guide tubes, a pair of traversing rods respectively slidably mounted in said tubes for telescopic movement relative thereto, said inspecting head being rigidly secured to mutually adjacent end portions of said rods, a fluid operated piston and cylinder driving device interconnecting said guide tubes and said inspecting head for effecting reciprocation of the latter, a rigidly mounted guide bar extending along the path of movement of an end portion of one of said traversing rods in spaced relation thereto, a slider movably mounted on said guide bar for selective positioning along the length thereof, means for securing said slider in selected position of adjustment on said guide bar, an arm pivotally mounted on said slider and having a free end portion engageable with the adjacent end portion of said guide rod and adapted to ride off the end thereof and rock on its pivot mounting when said inspection head arrives at a predetermined on-sheet position, and means actuated as an incident to said rocking movement of said arm to stop the on-sheet movement of said inspecting head at said predetermined on-sheet position.

5. An inspecting head adapted for mounting a radiation source and a radiation detector, said head including a pair of spaced arms which are adapted to embrace a traveling sheet for inspecting the same, means for mounting said head for reciprocating movement from off-sheet to on-sheet position and from on-sheet position to off-sheet position, said means comprising a pair of rigidly interconnected guide tubes, and a pair of traversing rods respectively slidably mounted in said tubes for telescopic movement relative thereto, said inspecting head being rigidly secured to mutually adjacent end portions of said rods, and a fluid operated piston and cylinder driving device interconnecting said guide tubes and said inspecting head for effecting reciprocation of the latter, the connection between said driving device and said inspection head embodying flexible means permitting a limited amount of deviation from parallelism of the axis of said driving device and the axes of said traversing rods and tubes.

6. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected guide tubes, a pair of traversing rods respectively slidably mounted in said tubes for telescopic movement relative thereto, said inspecting head being rigidly secured to mutually adjacent end portions of said rods, a fluid operated cylinder and piston driving device interconnecting said guide tubes and said inspecting head for effecting reciprocation of the latter, means fixedly mounted relative to said tubes and provided with a plunger which is engageable by said inspection head when the latter is moved to off-sheet position, and means actuated by said plunger as an incident to movement thereof by said inspection head for decelerating the terminal portion of the off-sheet movement of said inspection head.

7. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected guide tubes, a pair of traversing rods respectively slidably mounted in said tubes for telescopic movement relative thereto, said inspecting head being rigidly secured to mutually adjacent end portions of said rods, a fluid operated cylinder and piston driving device interconnecting said guide tubes and said inspecting head for effecting reciprocation of the latter, and means for decelerating the terminal portion of the off-sheet movement of said inspecting head, said decelerating means comprising a bracket which is rigidly secured to said guide tubes and which extends to one side of the plane of said tubes, a valve mounted on said bracket and having a movable control member, a plunger mounted in said bracket for axial movement in approximately parallel relation to the axes of said traversing rods, a cam surface on said plunger in operative engagement with said valve control member, and means carried by said inspecting head for engaging said plunger to effect valve adjusting movement thereof during a terminal portion of the off-sheet movement of said inspecting head.

8. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected guide tubes, a pair of traversing rods respectively slidably mounted in said tubes for telescopic movement relative thereto, said inspecting head being rigidly secured to mutually adjacent end portions of said rods, a fluid operated piston and cylinder driving device interconnecting said guide tubes and said inspecting head for effecting reciprocation of the latter, and means for automatically initiating off-sheet movement of said inspecting head in the event that the material being inspected by said head departs from its normal path of movement sufficiently to engage a side portion of one of the arms of said inspecting head, said last mentioned means comprising a member mounted on said side portion of the inspecting arm for movement toward said arm, and means actuated as an incident to such movement of said member for initiating off-sheet movement as aforesaid.

9. An inspecting head adapted for mounting a radiation source and a radiation detector, said head having a pair of spaced arms which are adapted to embrace a traveling sheet for inspecting the same, means for mounting said inspecting head for reciprocating movement between off-sheet and on-sheet positions, said means comprising a pair of mutually spaced, axially parallel, elongated guide tubes which are rigidly interconnected, a pair of traversing rods of greater length than said tubes and slidably mounted therein for telescopic movement relative thereto, said tubes having mutually adjacent end portions slotted to provide access to end portions of said traversing rods within said tubes, mounting bars rigidly secured to opposite side portions of said inspecting head and secured to end portions of said rods, said mounting bars being receivable in said slots when said traversing rods are retracted in said guide tubes, and a fluid actuated cylinder and piston driving device interconnecting said guide tubes and inspecting head for effecting reciprocation of the latter.

10. An inspecting head adapted for mounting a radiation source and a radiation detector, said head including a pair of spaced arms which are adapted to embrace a traveling sheet for inspecting the same, means for mounting said head for reciprocating movement from on-sheet to off-sheet position and from off-sheet to on-sheet position, said means comprising a pair of rigidly interconnected guide tubes, and a pair of traversing rods respectively slidably mounted in said tubes for telescopic movement relative thereto, said inspecting head being rigidly secured to mutually adjacent end portions of said rods, and means for effecting reciprocation of said inspecting head.

11. An inspecting head adapted for mounting a radiation source and a radiation detector, said head including a pair of spaced arms which are adapted to embrace a traveling sheet for inspecting the same, means for mounting said head for reciprocating movement from off-sheet position to on-sheet position and from on-sheet position to off-sheet position, said means comprising a pair of rigidly interconnected guide tubes, a pair of traversing rods respectively slidably mounted in said tubes for telescopic movement relative thereto, said inspecting head being rigidly secured to mutually adjacent end portions of said rods, a fluid operated piston and cylinder driving device interconnecting said guide tubes and said inspecting head for effecting reciprocation of the latter, and means for automatically initiating off-sheet movement of said inspecting head in the event that the material being inspected by said head departs from its normal path of movement sufficiently to engage a side portion of one of the arms of said inspecting head.

12. An inspecting head adapted for mounting a radiation source and a radiation detector, said head including a pair of spaced arms which are adapted to embrace a traveling sheet for inspecting the same, means for mounting said head for reciprocating movement between off-sheet and on-sheet positions, said means comprising a pair of axially parallel, elongated telescopic guide tube and rod structures, the rods thereof being of smaller cross-sectional size than the interior of the tubes thereof, bushings seated in end portions of said tubes for supporting said rods and guiding the movement thereof in said tubes, said inspecting head being mounted on mutually adjacent end portions of said rods, a plurality of cross members rigidly interconnecting said tubes in longitudinally spaced positions, at least one of said cross members having a plate-like portion which extends laterally to one side of the plane of said tubes, a cylinder disposed in substantially axially parallel relation to said guide tubes and rigidly secured at one end to said laterally extending, cross member, and a piston reciprocable in said cylinder and connected to said inspecting head so as to effect movement of said head when said piston is moved.

References Cited in the file of this patent

UNITED STATES PATENTS

| 582,286 | Hinkley | May 11, 1897 |
| 1,712,942 | Smith | May 14, 1929 |
| 2,124,006 | Parker | July 19, 1938 |
| 2,226,677 | Vikhman | Dec. 31, 1940 |
| 2,331,337 | Meyer | Oct. 12, 1943 |
| 2,349,846 | Corin | May 30, 1944 |
| 2,422,137 | Schindler | June 10, 1947 |
| 2,556,909 | Feibel | June 12, 1951 |
| 2,598,825 | Orellana | June 3, 1952 |
| 2,668,625 | Garland | Feb. 9, 1954 |
| 2,829,268 | Chope | Apr. 1, 1958 |

FOREIGN PATENTS

| 222,360 | Great Britain | Oct. 2, 1924 |
| 108,810 | Switzerland | Feb. 16, 1925 |